July 13, 1937.  E. MACAULEY  2,086,941
CLUTCH AND BRAKE MECHANISM
Filed Feb. 27, 1934
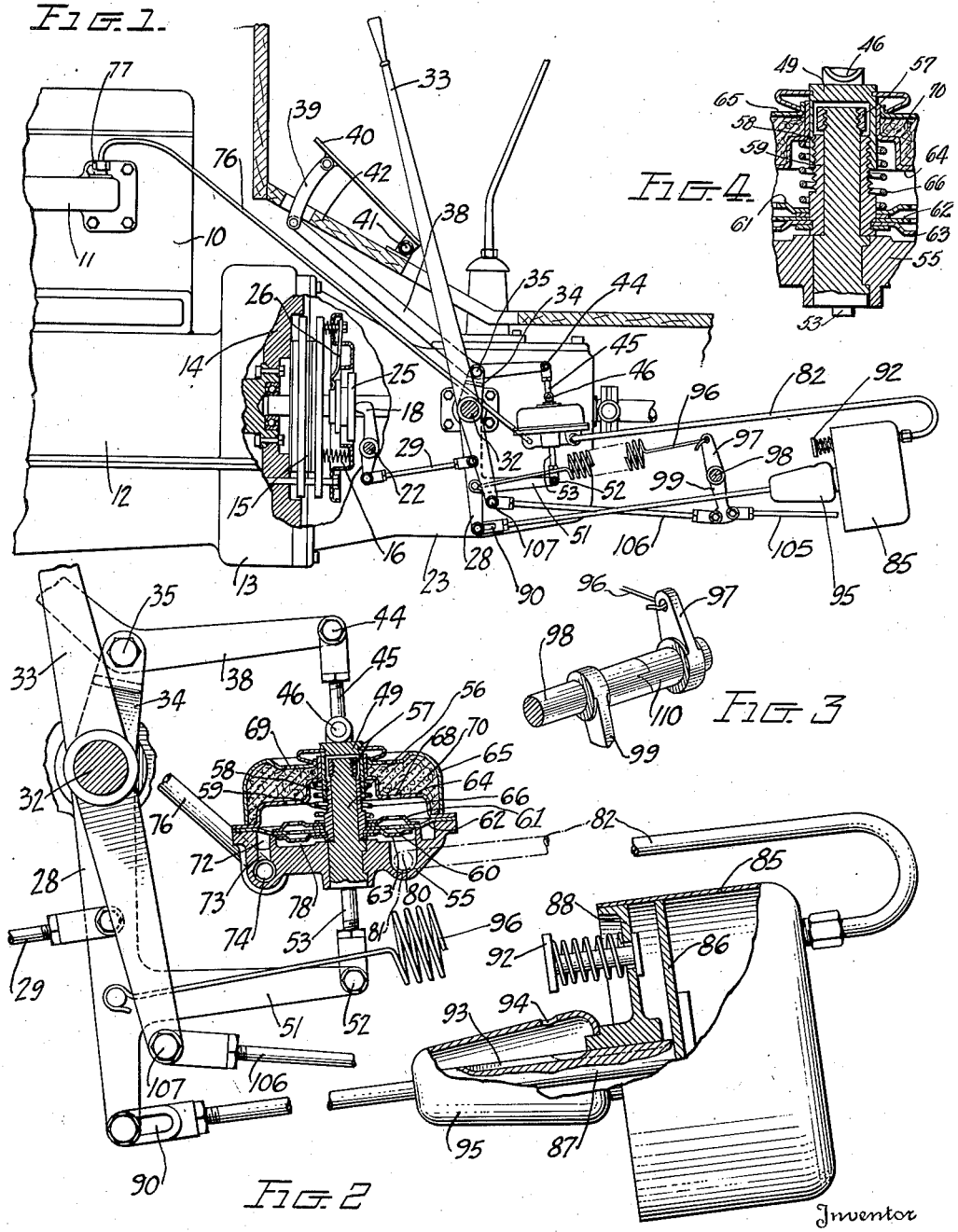

Patented July 13, 1937

2,086,941

UNITED STATES PATENT OFFICE 2,086,941

CLUTCH AND BRAKE MECHANISM

Edward Macauley, Detroit, Mich., assignor to Packard Motor Car Company, Detroit, Mich., a corporation of Michigan Application February 27, 1934, Serial No. 713,201

8 Claims. (Cl. 192—13)

This invention relates to mechanism for actuating the clutch of a motor vehicle and has for its object a material reduction in the manual effort required for clutch actuation. It is a feature of the invention that manual release of the clutch is facilitated by the action of a power storing device which opposes but does not entirely counteract the action of the usual clutch engaging springs, this power storing device being separately energizable prior to actuation of the manually operable clutch releasing mechanism.

It is a more specific object of the invention to provide a yielding device, for instance a spring, which is capable of being stressed so as to oppose the action of the conventional clutch engaging springs, and connections between this yielding means and the usual emergency brake operating lever for applying stress thereto. By means of this construction it is possible to set the emergency brake and by so doing to reduce materially the degree of force required for operation of the usual clutch pedal or the like.

The invention is particularly applicable to and is primarily intended for use with a clutch operating system employing a clutch releasing servo-motor in which the operation of the servo-motor is manually controlled and in which provision is made for manual release of the clutch when the servo-motor is inoperative. Servo-motors of this character may be supplied with motive power from the vehicle driving motor, for instance by connection with the intake manifold of the latter, and when the vehicle motor is not in operation, the servo-motor cannot be employed to release the clutch. When the vehicle motor is started, particularly in cold weather, it is desirable to disengage the clutch to relieve the load on the motor until the motor temperature rises somewhat, and with the arrangement just described the clutch must be manually disengaged for this purpose. It is common practice, when a clutch releasing servo-motor is employed, to provide manually operable clutch actuating mechanism having relatively low leverage and consequently considerable effort is required to release the clutch manually and to maintain disengagement. In the preferred embodiment of the invention disclosed herein the application of the emergency brake by the usual brake operating means applies tension to a spring which is so arranged as to oppose the action of the clutch engaging springs as hereinbefore explained, with the result that the manual control of the clutch is rendered much easier.

Further objects and features of the invention will be apparent from the following description taken in connection with the accompanying drawing, in which Figure 1 is a side elevational view, with certain parts shown in section, of clutch actuating mechanism constructed in accordance with the principles of the invention;

Figure 2 is an enlarged view, partly in section, of a portion of the mechanism shown in Figure 1;

Figure 3 is a perspective view of certain parts shown in Figure 1 illustrating one mode of connection of the brake actuating means with the power storing device; and Figure 4 is an enlarged sectional view of a portion of the structure shown in Figure 2.

In order to facilitate an understanding of the invention specific language is used in describing the preferred embodiment thereof as illustrated in the accompanying drawing. It will be appreciated, however, that no limitation of the scope of the invention is thereby intended but that such changes and alterations are contemplated as fall within the definition of the invention set forth in the appended claims.

Figure 1 of the drawing shows a vehicle motor 10 having an intake manifold 11 and a crank case 12, a flywheel housing 13 communicating with the crank case and enclosing a flywheel 14 associated with a clutch 15 of conventional construction, springs 16 acting to engage the clutch. The action of the springs 16 is opposed and the clutch released by means of a clutch operating lever 18 supported for oscillation on a shaft 22 which is in turn mounted in the transmission housing 23, the lever 18 engaging a collar 25 which in turn engages the clutch fingers 26 to release the clutch when the collar is displaced to the left. The structure thus far described is conventional and the details thereof form no essential part of the present invention.

The lower end of the lever 18 is connected with a clutch operating arm 28 by means of a rod 29 pivotally connected to the lever and to the arm. The arm 28 is supported for oscillation on the shaft 32 to which the emergency brake lever 33 is secured and is provided with an upstanding portion 34 on which is pivotally mounted as at 35 a clutch actuating lever 38. Adjacent the forward end thereof the lever 38 is provided with an articulated connection, consisting of a link 39, with a clutch treadle 40 which is in turn pivotally mounted as at 41 on the floorboard 42 of the vehicle forward of the driver's seat. The rearward arm of the lever 38 is pivotally connected as at 44 with a link 45 which is in turn pivotally connected at 46 to a valve actuating member 49, the link 45 being formed into sections threaded together to permit adjustment of the length thereof.

The clutch operating arm 28 is further provided with a rearwardly directed portion 51 pivotally connected as at 52 with a member 53, the length of which is adjustable. The member 53 carries a valve housing 55 and is provided with an upstanding stem 56 extending through the valve housing and receiving at its upper end a nut 57. The valve actuating member 49 is provided with a threaded connection 58 to a sleeve 59 to which is secured an annular valve diaphragm 62. This diaphragm is clamped in position between the peripheral portion of the valve housing 55 and a valve cover comprising the annular members 64 and 65, the latter being apertured at 68 and 69 respectively to permit passage of air therethrough, a suitable filter medium 70 being enclosed between the members 64 and 65 to exclude dirt from the valve housing and associated members.

The diaphragm 62, normally retained in seated position by a coil spring 66 surrounding the sleeve 59, is apertured as at 60 and is shown in Figure 2 of the drawing in its seated position, reenforcement being effected by an annular element 61 which is similarly apertured. An annular member 63 carried by the sleeve 59 is spaced from the diaphragm 62 in the closed position of the latter but engages the diaphragm when the latter is raised to exclude air from the valve housing as will be hereinafter explained. The movement of the diaphragm 62 from seating position is limited by engagement of the upper end of the sleeve 59 with the nut 57 carried by the stem 56.

The valve housing 55 is formed to provide an annular passage 72 communicating as at 73 with a port 74 which in turn communicates with a pipe 76 connected at 77 with the intake manifold 11 of the vehicle motor, the pipe 76 being preferably flexible to some extent to permit slight movement of the valve housing. An annular passage 78 also formed in the valve housing communicates with a port 80 through a passage 81, the port 80 in turn communicating with a pipe 82, preferably somewhat flexible, which is in open communication with the interior of a cylinder 85 in which a piston 86 is reciprocable, the piston being secured to a shaft 87 extending through the forward wall 88 of the cylinder, the piston and cylinder functioning as a servo-motor for the actuation of the clutch 15.

Thus the shaft 87 may be provided adjacent the forward end thereof with a pin and slot connection as indicated at 90 to the lower end of the clutch operating arm 28, whereby rearward movement of the piston 86 and shaft 87 serves to draw the arm 28 rearwardly and release the clutch through the medium of the rod 29 and clutch lever 18, this rearward movement of the piston taking place whenever the head or outer end of the cylinder 85 is placed in communication with the intake manifold 11 of the vehicle motor, air being simultaneously admitted to the inner end of the cylinder 85 through the spring pressed check valve 92 which is displaced inwardly as the piston 86 moves rearwardly. When communication between the intake manifold and the outer end of the cylinder 85 is interrupted, the piston 86 moves forwardly to permit the clutch spring 16 to reengage the clutch, air being discharged somewhat slowly from the inner end of the cylinder 85 through an axial groove 93 formed in the shaft 87 and through an aperture 94 in a grease retaining and dust excluding housing 95.

The operation of the mechanism thus far described will be apparent. When the clutch treadle 40 is depressed, the clutch actuating lever 38 will be rocked on its fulcrum 35 to lift the rod 45 and the sleeve 59 to raise the diaphragm 62 from its seating position in which it covers the annular passages 72 and 78, the annular element 63 engaging the diaphragm 62 as the latter is raised to exclude air from the passage 78. Air is thus drawn from the head end of the cylinder 85 through the pipe 82 into the annular passages 78 and 72 in succession, from whence it is conveyed through the pipe 76 into the intake manifold 11, and as the air is thus discharged from the cylinder 85, the piston 86 moves rearwardly to release the clutch as hereinbefore described. When the clutch treadle 40 is released, the coil spring 66 forces the diaphragm 62 into seating position, and as shown in Figure 2, the annular passage 72 is sealed from the passage 78. At the same time the diaphragm 62 and the element 63 separate so that air may flow into the passage 78 through the apertures 69, 68 and 60 and thence through the pipe 82 into the outer end of the cylinder, the restricted communication between the exterior of the cylinder 85 and both sides of the piston 86 thus afforded permitting the piston to partake of somewhat retarded forward motion, whereby the clutch is smoothly engaged.

If for any reason the clutch-actuating servo-motor is not functioning, for instance if the motor 10 is not in operation, manual release of the clutch may be effected by further depression of the clutch treadle 40. Thus as the clutch treadle 40 is depressed the sleeve 59 abuts the nut 57 on the stem 56 and further depression of the treadle 40 lifts the valve housing 55 which acts through the portion 51 of the arm 28 to rotate the latter in a counterclockwise direction and thus release the clutch through the rod 29 and the clutch operating lever 18.

Since the depression of the treadle 40 when the servo-motor is not in operation requires considerable force owing to the low leverage ratio employed, it is desirable to counteract in part the action of the clutch springs tending to engage the clutch when manual operation of the latter is necessary or desired. For this purpose a power storing device is provided which comprises in its preferred form a coil spring 96 connected at its forward end with the lever 28 and at its rearward end with an arm 97 supported on a shaft 98 which is in turn carried by the frame of the vehicle, the arm 97 being operatively connected with an arm 99, similarly supported on the shaft 98. The arm 99 is pivotally connected to an emergency brake operating cable 105 extending rearwardly and to a rod 106 extending forwardly, the latter being pivotally connected as at 107 to the lower end of the emergency brake lever 33.

When the brake lever 33 occupies its forward position corresponding to the released position of the brake, the spring 96 is preferably under little or no tension and is not affected by operation of the clutch releasing mechanism. In the event a relatively stiff spring is employed the arm 97 may be permitted to swing rearwardly as the clutch operating arm 28 is rocked in a counterclockwise direction to release the clutch, for instance by means of a toothed connection 110 between the arms 97 and 99. Thus the spring 96 may be so stiff that the emergency brake might be applied on operation of the clutch pedal if this one-way connection were not employed. If, however, the brake lever 33 be moved rearwardly to apply the emergency brake, the arms 99 and 97 will be rocked in unison in a clockwise direction to tension the spring 96, the stress thus imparted to the spring being applied to the clutch operating arm 28 to urge the latter in a counterclockwise direction. The characteristics of the spring 96 are such that when the emergency brake is applied, the force exerted by the spring is insufficient to overcome the action of the clutch springs 16 tending to engage the clutch 15, but opposes the action of these springs to a sufficient extent to reduce materially the force required to release the clutch. As the clutch is manually released in the manner hereinbefore described, the arm 28 moves rearwardly, thus reducing the tension in the spring 96, but the movement thus imparted to the clutch operating lever 28 is much less than the initial movement of the arm 97 when the emergency brake is applied, so that considerable force is exerted by the spring 96 tending to maintain the clutch in a released position even when the treadle 40 is fully depressed. For instance, the ratio of movement of the point of connection of the forward end of the spring 96 to the clutch operating arm 28 and the point of connection of the rearward end of the spring 96 to the arm 97 may be approximately 1:3 whereby adequate force will be exerted by the spring 86 to assist the operator in maintaining the treadle 40 in the depressed position.

It will be understood that apparatus described herein as manually operated may be either hand or foot actuated. It will also be appreciated that other types of servo-motor, and servo-motors deriving energy from other sources than the vehicle motor, may be employed and that if desired some other type of valve and manual clutch actuating mechanism may be substituted for that shown and described herein. It is an essential feature of the invention, however, that a power storing device which may be energized at the will of the operator acts as an assister in the manual control of the vehicle clutch, and that in the preferred form and the more specific aspect of the invention, energization of the power storing device is effected by the brake lever which is ordinarily employed only when the vehicle is standing, commonly referred to as the emergency brake lever, as distinguished from the conventional service brake lever.

Having thus described the invention, what is claimed as new and desired to be secured by Letters Patent is:

1. In a motor vehicle, the combination with a vehicle clutch, of a servo-motor associated with said clutch for operation thereof, manual control means for initiating operation of said servo-motor, means operatively connecting said manual control means and said clutch, whereby manual operation of said clutch may be effected, emergency brake operating means, and means operable by said brake operating means for reducing the force required for manual operation of said clutch by said manual control means.

2. In a motor vehicle, the combination with a vehicle driving motor, a clutch associated with said motor, a servo-motor deriving motive force from said vehicle driving motor and associated with said clutch for releasing the latter, manually operable means for controlling said servo-motor, a mechanical connection between said manually operable means and said clutch, whereby manual operation of said clutch may be effected, emergency brake operating means, and means operable by said brake operating means for reducing the force required for manual operation of said clutch, whereby release of said clutch when said vehicle driving motor is inoperative is facilitated.

3. In a motor vehicle, the combination with a vehicle driving motor, a clutch associated with said motor, a servo-motor deriving motive force from said vehicle driving motor and associated with said clutch for releasing the latter, manually operable means for controlling said servo-motor, a mechanical connection between said manually operable means and said clutch, whereby manual operation of said clutch may be effected, emergency brake operating means, and means operable by said brake operating means for reducing the force required for manual operation of said clutch, whereby release of said clutch when said vehicle driving motor is inoperative is facilitated, said last named means comprising a yielding power storing device acting between said brake operating means and said clutch for urging the latter toward released position when said emergency brake is applied, the force exerted by said device being insufficient to release said clutch when unaided.

4. In a motor vehicle, the combination with a vehicle clutch, of a servo-motor associated with said clutch for operating the latter, manual operating means for said clutch, and means associated with said clutch for reducing the force normally required for operation thereof, whereby manual operation of said clutch when said servo-motor is inoperative may be facilitated.

5. In a motor vehicle, the combination with a vehicle clutch, of a servo-motor associated with said clutch for operating the latter, manual operating means for said clutch, and a power storing device associated with said clutch for reducing the force normally required for operation thereof, whereby manual operation of said clutch when said servo-motor is inoperative may be facilitated.

6. In a motor vehicle, the combination with a vehicle driving motor, a clutch associated with said motor, a servo-motor deriving motive force from said vehicle driving motor and associated with said clutch for releasing the latter, manually operable means for controlling said servo-motor, a mechanical connection between said manually operable means and said clutch, whereby manual operation of said clutch may be effected, emergency brake operating means, means operable by said brake operating means for reducing the force required for manual operation of said clutch, whereby release of said clutch when said vehicle driving motor is inoperative is facilitated, said last named means comprising a spring so connected with said clutch as to exert a force thereon when stressed tending but not sufficient to release the clutch, and a connection between said brake operating means and said spring for applying such stress to the latter.

7. In a motor vehicle, the combination with a vehicle driving motor, of a motor clutch, a servo-motor operable by the intake vacuum of said motor for releasing said clutch, a valve controlling the operation of said servo-motor, manually operable means for actuating said valve, means including a lost motion connection between said means and said clutch permitting manual release of the latter when said servo-motor is inoperative, and a power storing device associated with said last named means for facilitating manual release of said clutch.

8. In a motor vehicle, the combination with a vehicle driving motor, of a motor clutch, a servo-motor operable by the intake vacuum of said motor for releasing said clutch, a valve controlling the operation of said servo-motor, manually operable means for actuating said valve, means including a lost motion connection between said means and said clutch permitting manual release of the latter when said servo-motor is inoperative, an emergency brake lever, a power storing device associated with said last named means for facilitating manual release of said clutch, and a connection between said emergency brake lever and said power storing device for energizing the latter when the brake is applied.

EDWARD MACAULEY.